United States Patent
Lee et al.

(10) Patent No.: US 12,252,000 B2
(45) Date of Patent: Mar. 18, 2025

(54) BATTERY PACK WITH EFFICIENT COOLING PATH STRUCTURE AND IMPROVED SAFETY AND VEHICLE INCLUDING THE SAME

(71) Applicant: LG ENERGY SOLUTION, LTD., Seoul (KR)

(72) Inventors: Tae-Kyeong Lee, Daejeon (KR); Sung-Hoon Woo, Daejeon (KR); Young-Il Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 480 days.

(21) Appl. No.: 17/765,253

(22) PCT Filed: Apr. 13, 2021

(86) PCT No.: PCT/KR2021/004675
§ 371 (c)(1),
(2) Date: Mar. 30, 2022

(87) PCT Pub. No.: WO2021/221353
PCT Pub. Date: Nov. 4, 2021

(65) Prior Publication Data
US 2022/0348068 A1 Nov. 3, 2022

(30) Foreign Application Priority Data
Apr. 29, 2020 (KR) .................. 10-2020-0052833

(51) Int. Cl.
*H01M 10/625* (2014.01)
*B60K 1/04* (2019.01)
(Continued)

(52) U.S. Cl.
CPC ............... *B60K 1/04* (2013.01); *B60L 50/64* (2019.02); *B62D 25/20* (2013.01); *B62D 29/008* (2013.01);
(Continued)

(58) Field of Classification Search
CPC ..... B60K 1/04; B60K 2001/005; B60L 50/64; B60L 58/26; B62D 25/20; B62D 29/008;
(Continued)

(56) References Cited

U.S. PATENT DOCUMENTS 8,999,548 B2 * 4/2015 Sun .................. H01M 10/617
429/120
11,155,150 B2 * 10/2021 Stephens ............... B60K 11/02
(Continued)

FOREIGN PATENT DOCUMENTS

CN 107966056 A * 4/2015 ........... F28D 9/0031
CN 207368169 U 5/2018
(Continued)

OTHER PUBLICATIONS

International Search Report for PCT/KR2021/004675 mailed on Jul. 19, 2021.
(Continued)

*Primary Examiner* — Steve Clemmons
(74) *Attorney, Agent, or Firm* — Birch, Stewart, Kolasch & Birch, LLP

(57) ABSTRACT

A battery pack includes battery modules provided with a heatsink; a pack housing including a floor panel having an upper surface on which the battery modules are placed and a lower surface in which coolant channels for supplying and discharging a coolant to/from the heatsink of the battery modules, and a base plate disposed below the floor panel in a layered form; and a coolant supply pipe for selectively communicating with the coolant channels, coupled to an (Continued)

upper surface of the floor panel and disposed along a right side line of the floor panel; and a coolant discharge pipe for selectively communicating with the coolant channels, coupled to the upper surface of the floor panel and disposed along a left side line of the floor panel, with the coolant channels have a lower end fixedly coupled to the base plate.

15 Claims, 10 Drawing Sheets

(51) Int. Cl.
| | | |
|---|---|---|
| B60L 50/64 | (2019.01) | |
| B62D 25/20 | (2006.01) | |
| B62D 29/00 | (2006.01) | |
| H01M 10/613 | (2014.01) | |
| H01M 10/6556 | (2014.01) | |
| H01M 10/6568 | (2014.01) | |
| H01M 50/249 | (2021.01) | |
| B60K 1/00 | (2006.01) | |

(52) U.S. Cl.
CPC ....... H01M 10/613 (2015.04); H01M 10/625 (2015.04); H01M 10/6556 (2015.04); H01M 10/6568 (2015.04); H01M 50/249 (2021.01); *B60K 2001/005* (2013.01); *B60K 2001/0438* (2013.01); *H01M 2220/20* (2013.01)

(58) Field of Classification Search
CPC ............ H01M 10/613; H01M 10/625; H01M 10/6556; H01M 10/6568; H01M 10/6551; H01M 10/6552; H01M 50/249; H01M 2220/20
See application file for complete search history.

(56) References Cited

U.S. PATENT DOCUMENTS

| | | | | |
|---|---|---|---|---|
| 11,171,372 | B2* | 11/2021 | Pucher | ................ H01M 50/204 |
| 11,424,503 | B2* | 8/2022 | Shinoda | ................... B60L 58/26 |
| 11,450,913 | B2* | 9/2022 | Seo | ......................... B60L 58/26 |
| 11,479,087 | B2* | 10/2022 | Yamagishi | ............. B60K 11/02 |
| 11,926,244 | B2* | 3/2024 | Gehringhoff | ....... H01M 10/613 |
| 2016/0372805 | A1 | 12/2016 | Kim et al. | |
| 2018/0154754 | A1 | 6/2018 | Rowley et al. | |
| 2018/0186227 | A1* | 7/2018 | Stephens | ................. B60K 1/04 |
| 2018/0337376 | A1 | 11/2018 | Jin et al. | |
| 2019/0100090 | A1* | 4/2019 | Matecki | ............. H01M 50/204 |
| 2019/0312322 | A1 | 10/2019 | Ahn et al. | |
| 2020/0006824 | A1 | 1/2020 | Lim | |
| 2020/0006825 | A1 | 1/2020 | Lee et al. | |
| 2020/0127349 | A1 | 4/2020 | Park et al. | |
| 2020/0180417 | A1 | 6/2020 | Marquez Duran et al. | |
| 2020/0194854 | A1* | 6/2020 | Ahn | .................. H01M 10/6556 |
| 2020/0251698 | A1* | 8/2020 | Paramasivam | ..... H01M 10/613 |
| 2021/0351455 | A1 | 11/2021 | Kim et al. | |

FOREIGN PATENT DOCUMENTS

| | | | | |
|---|---|---|---|---|
| CN | 208368689 U | * | 1/2019 | ......... F28D 1/05366 |
| CN | 210092152 U | | 2/2020 | |
| CN | 210272607 U | * | 4/2020 | |
| DE | 102015115875 A1 | * | 3/2017 | .......... H01M 10/613 |
| DE | 102018207640 A1 | * | 11/2019 | |
| EP | 3 637 536 B1 | | 12/2021 | |
| JP | 2009-301877 A | | 12/2009 | |
| JP | 2020-9694 A | | 1/2020 | |
| KR | 10-2015-0100365 A | | 9/2015 | |
| KR | 10-2018-0081996 A | | 7/2018 | |
| KR | 10-2018-0083140 A | | 7/2018 | |
| KR | 10-2018-0125795 A | | 11/2018 | |
| KR | 10-2019-0070548 A | | 6/2019 | |
| KR | 102002861 B1 | * | 7/2019 | |
| KR | 10-2020-0001692 A | | 1/2020 | |
| KR | 10-2020-0001781 A | | 1/2020 | |
| KR | 20200020482 A | * | 2/2020 | |
| KR | 10-2020-0033776 A | | 3/2020 | |
| KR | 10-2020-0037237 A | | 4/2020 | |
| KR | 10-2020-0042401 A | | 4/2020 | |
| KR | 10-2020-0044580 A | | 4/2020 | |
| WO | WO-2017188560 A1 | * | 11/2017 | .............. B60L 50/64 |
| WO | WO-2018131776 A1 | * | 7/2018 | .......... H01M 10/613 |
| WO | WO-2018186566 A1 | * | 10/2018 | ............. B27B 17/12 |
| WO | WO-2019221376 A1 | * | 11/2019 | ............. B60L 50/64 |
| WO | WO 2020/054998 A1 | | 3/2020 | |

OTHER PUBLICATIONS

Extended European Search Report for European Application No. 21796342.0, dated Jul. 12, 2024.

* cited by examiner

BATTERY PACK WITH EFFICIENT COOLING PATH STRUCTURE AND IMPROVED SAFETY AND VEHICLE INCLUDING THE SAME

TECHNICAL FIELD

The present disclosure relates to a battery pack, and more particularly, to a battery pack to which an assembly structure for efficient cooling path configuration and stable coolant supply and discharge is applied.

The present application claims priority to Korean Patent Application No. 10-2020-0052833 filed on Apr. 29, 2020 in the Republic of Korea, the disclosures of which are incorporated herein by reference.

BACKGROUND ART

Secondary batteries that are easy to apply according to product groups and have electrical characteristics such as high energy density are commonly applied to not only portable devices, but also electric vehicles (EVs) or hybrid electric vehicles (HEVs) driven by electric drive sources, and electric storage devices. The secondary batteries are attracting attention as a new energy source for improving eco-friendliness and energy efficiency in that they do not generate any by-products from the use of energy as well as the primary advantage of dramatically reducing the use of fossil fuels.

A battery pack applied to an electric vehicle or the like has a structure in which a plurality of cell assemblies having a plurality of unit cells are connected in series to obtain a high output. In addition, the unit cell may be repeatedly charged and discharged by an electric chemical reaction between components, including positive and negative electrode current collectors, a separator, an active material, an electrolyte, and the like.

Meanwhile, as the need for a large-capacity structure, including its use as an energy storage source, increases recently, the demand for a battery pack having a multi-module structure in which a plurality of battery modules, each having a plurality of secondary batteries connected in series and/or parallel, are grouped is increasing.

It is important that the battery pack with a multi-module structure applied to an electric vehicle is designed to have as high energy density per unit volume as possible because of the restriction on an installation space inside the vehicle and to easily dissipate the heat generated by the intensively arranged battery modules most of all. Among various methods of dissipating heat generated from the battery module, an indirect water cooling method as disclosed in Patent Document 1 (Korean Unexamined Patent Publication No. 10-2015-0100365) or Patent Document 2 (Korean Unexamined Patent Publication No. 10-2018-0081996) is widely used.

Seeing the cooling configuration of the indirect water-cooled battery pack according to the prior art, a heatsink is coupled to an upper surface of a tray forming a bottom surface of a pack case, a thermal pad is interposed on the heatsink, and then a battery module is mounted on the thermal pad so that the heat of the battery module is dissipated to the outside through the thermal pad and the heatsink.

However, the battery pack according to the prior art as disclosed in Patent Document 1 or Patent Document 2 may not be easily assembled since the number of components and fixing structures required to fix the heatsink to the upper surface of the tray increases and the layout of an inlet hose and an outlet hose for supplying a coolant to the heatsink is difficult.

In addition, even if the heatsink is fixed to the tray with a rivet or the like, the entire lower surface of the heatsink is not completely adhered to the upper surface of the tray, so a gap exists therebetween. For this reason, if an external shock is applied to the tray so that the tray vibrates, the heatsink may be damaged. As this situation continues, a crack may occur in the heatsink, resulting in coolant leakage.

Accordingly, there is a demand for the development of a battery pack having a new cooling configuration that may supplement the problems of the water-cooled battery pack according to the prior art.

DISCLOSURE

Technical Problem

The present disclosure is designed to solve the problems of the related art, and therefore the present disclosure is directed to providing a battery pack capable of reducing the number of cooling components included in a pack housing and simplifying the assembly process by using an efficient the cooling path configuration.

In addition, the present disclosure is directed to integrating a cooling path configuration having an easy layout and excellent durability into the pack housing stably.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: battery modules provided with a heatsink; a pack housing including a floor panel having an upper surface on which the battery modules are placed and a lower surface in which coolant channels for supplying and discharging a coolant to/from the heatsink of the battery modules are provided, and a base plate disposed below the floor panel in a layered form; and a coolant supply pipe configured to selectively communicate with the coolant channels and be coupled to an upper surface of the floor panel and disposed along a right side line of the floor panel; and a coolant discharge pipe configured to selectively communicate with the coolant channels and be coupled to the upper surface of the floor panel and disposed along a left side line of the floor panel, wherein the coolant channels have a lower end fixedly coupled to the base plate.

The coolant channels may be provided in a rectangular tube shape to extend from the right side line to the left side line of the floor panel, and the lower end of the coolant channels in a rectangular tube shape may be joined to the base plate by friction stir welding.

The floor panel may further include a support member formed on the lower surface of the floor panel to protrude as much as a thickness of the coolant channels.

The support member may have a longitudinal section of a '⊥' shape extending from the right side line to the left side line of the floor panel.

The heatsink may is configured as a bottom plate of the battery module.

The coolant channels may include a first coolant channel configured to introduce a coolant into any one battery module and a second coolant channel configured to discharge a coolant from the any one battery module, and the first coolant channel and the second coolant channel may be provided in a plurality of pairs, and the plurality of pairs of first coolant channels and second coolant channels may be arranged at predetermined pattern intervals along a front and rear direction of the pack housing.

The interval between the pairs of first coolant channels and the second coolant channels may be smaller than a width of the battery modules.

Two injection ports are provided in a central area of the floor panel for one first coolant channel and two discharge ports are provided in the central area of the floor panel for one second coolant channel.

The battery modules may be arranged such that two battery modules face each other, respectively, and two battery modules facing each other may be configured such that the coolant is supplied thereto through one of the two injection ports, respectively, and the coolant is discharged therefrom through one of the two discharge ports, respectively.

The pack housing may further include a front frame forming a front wall, a rear frame forming a rear wall, a right side frame forming a right wall and a left side frame forming a left wall, the front frame, the rear frame, the right side frame and the left side frame are vertically coupled to the floor panel, respectively.

The right side frame may include a first pipe protection membrane configured to cover the coolant supply pipe, and the left side frame may include a second pipe protection membrane configured to cover the coolant discharge pipe.

The first pipe protection membrane may include a first horizontal plate disposed on the coolant supply pipe and a first vertical plate bent at one end of the first horizontal plate to extend downward with an end line of the first vertical plate being welded to the floor panel, and the second pipe protection membrane may include a second horizontal plate disposed on the coolant discharge pipe and a second vertical plate formed at one end of the second horizontal plate to extend downward with an end line of the second vertical plate being welded to the floor panel.

At least one side of the battery modules may be fastened to the first horizontal plate or the second horizontal plate by a bolt.

The floor panel, the front frame, the rear frame, the right side frame and the left side frame may be an aluminum extrusion structure, respectively.

Meanwhile, in another aspect of the present disclosure, there may be provided a vehicle, comprising the battery pack described above.

Advantageous Effects

According to an embodiment of the present disclosure, it is possible to provide a battery pack capable of reducing the number of cooling components included in the pack housing and simplifying the assembly process by using an efficient cooling path configuration.

More specifically, since the battery pack of the present disclosure includes battery modules integrated with a heatsink such as a cooling plate and a pack housing having coolant channels for supplying or discharging a coolant to/from the battery modules, the number of components of a cooling device or the number of components for fixing them to be installed inside the pack housing is reduced, thereby greatly simplifying the assembly process, compared to the prior art.

In addition, in the battery pack of the present disclosure, since the coolant channels are connected to the base plate and the cooling path structure is designed stably, the reliability of the cooling function may be maintained against shock or vibration.

Other effects of the present disclosure may be understood by the following description and will be more clearly understood by the embodiments of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
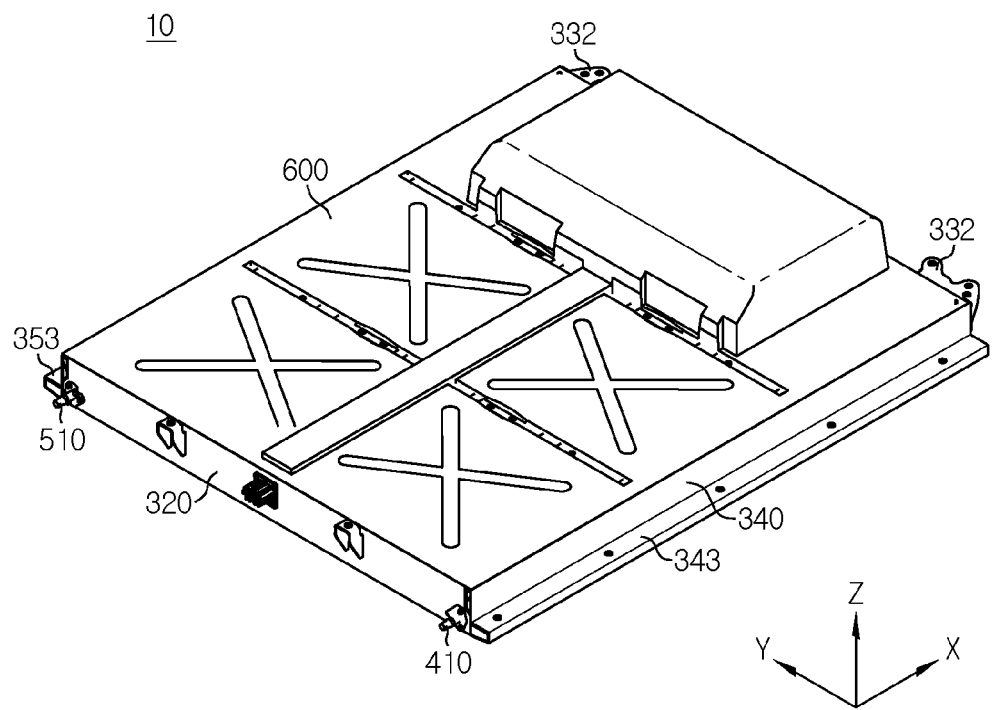
FIG. 1 is a schematic perspective view showing a battery pack according to an embodiment of the present disclosure.
Figure 2:
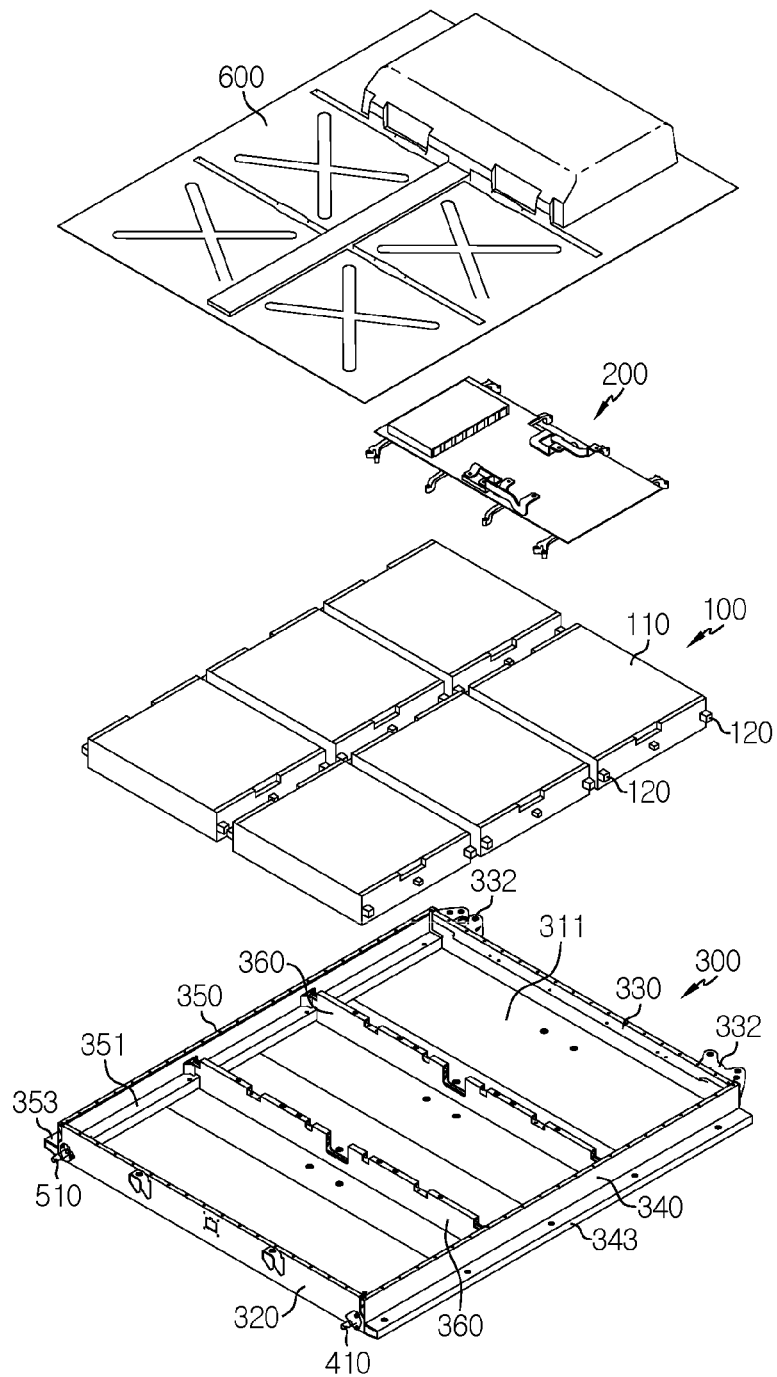
FIG. 2 is an exploded perspective view schematically showing the battery pack of FIG. 1.
Figure 3:
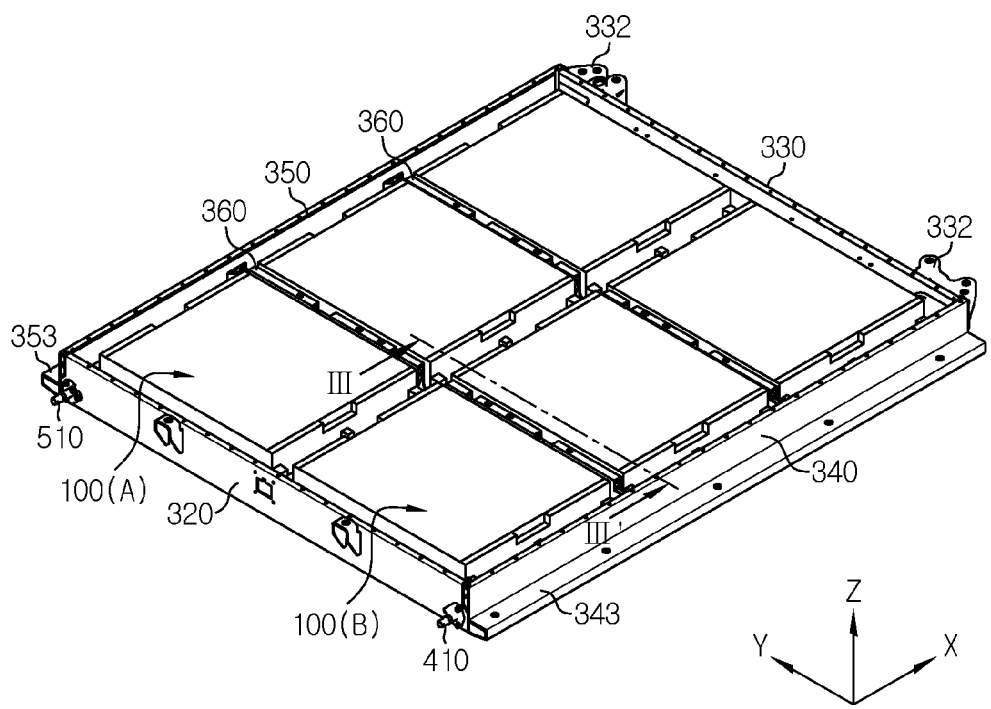
FIG. 3 is a perspective view showing a pack housing in which battery modules of FIG. 2 are placed.

FIG. 1 is a schematic perspective view showing a battery pack according to an embodiment of the present disclosure, FIG. 2 is an exploded perspective view schematically showing the battery pack of FIG. 1, and FIG. 3 is a perspective view showing a pack housing in which battery modules of FIG. 2 are placed.

Referring to these drawings, a battery pack 10 according to an embodiment of the present disclosure includes a plurality of battery modules 100, an electric component assembly 200, a pack housing 300 and a pack cover 600.

Figure 12:
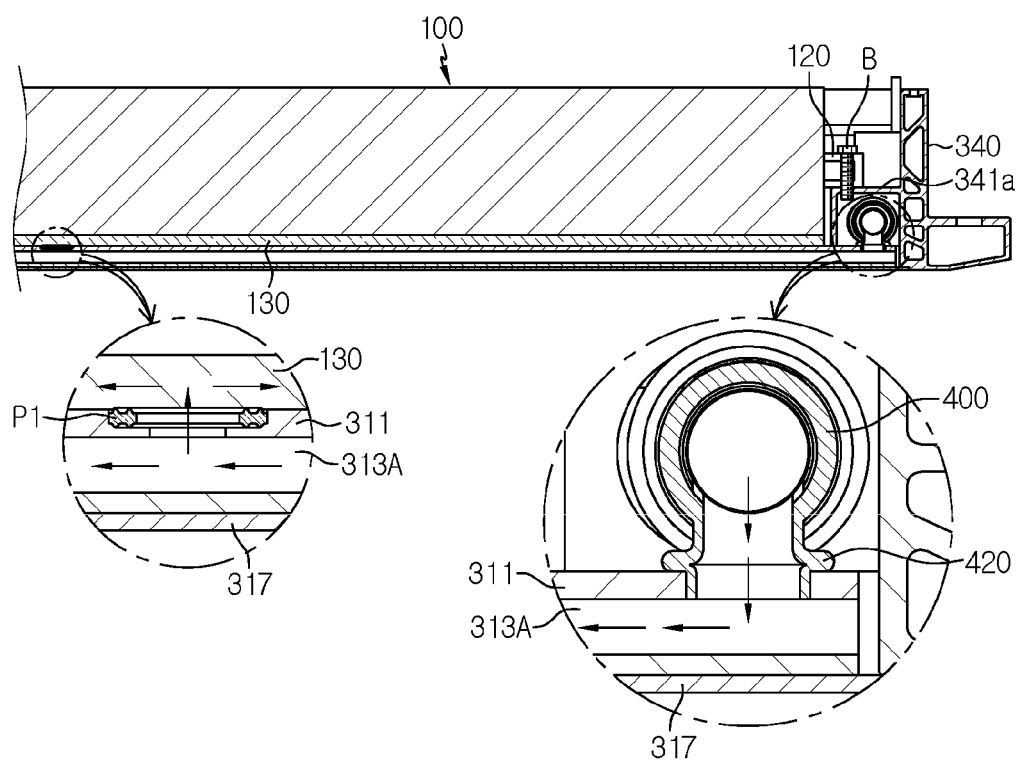
FIG. 12 is a sectioned view, taken along the line III-III' of FIG. 3.

The battery module 100 may include a cell assembly formed by stacking a plurality of battery cells, a module case 110 for accommodating the cell assembly, and a heatsink 130 (see FIG. 12).

For example, a pouch-type secondary battery may be employed as the battery cell, and the pouch-type secondary batteries may be configured to be erected vertically such that their wide surfaces are oriented upward and downward, and the pouch-type secondary batteries may be stacked in one direction to form a cell assembly.

The module case 110 may be configured in a rectangular box shape to surround the outside of the cell assembly so that the cell assembly may be held therein. In order to sufficiently protect the cell assembly from swelling of the pouch-type secondary battery and external impact, it may be preferable that the module case 110 is made of a metal material with high mechanical rigidity.

The heatsink 130 (see FIG. 12) refers to an object that absorbs heat from another object by thermal contact and dissipates the heat, and may be provided in the form of a plate-shaped body having a channel therein. The heatsink 130 may be mounted under a bottom plate, which is a part of the module case 110, or may be provided to serve as a bottom plate of the module case 110 by itself to be integrated with the battery module 100.

When the battery module 100 is placed on an upper surface of a floor panel 311, explained later, the heatsink 130 may have an entrance vertically connected to any one coolant channels 313A, 313B and an exit connected vertically to the other coolant channel 313A, 313B.

As will be described in detail later, a coolant may absorb heat from the battery cells while circulating along the channel formed inside the heatsink 130 through the entrance of the heatsink 130 in the any one coolant channels 313A, 313B, and discharge the heat out of the heatsink 130 through the exit of the heatsink 130 along the other coolant channels 313A, 313B.

Meanwhile, in order to increase the capacity and output of the battery pack 10, a large number of battery modules 100 are required, and accordingly, the number of parts such as inter-bus bars for wiring between the battery modules 100, harness cables for transmitting voltage data and temperature data of each battery module 100 to a BMS (Battery Management System), connectors, or the like increases.

The battery pack 10 of this embodiment adopts a large-capacity battery module 100 whose size is 2 to 4 times larger than an existing general battery module 100, and compared with the conventional battery pack having the same capacity and output, the total number of battery modules 100 mounted in the pack housing 300 is small. In other words, by increasing the capacity of the battery module 100 so that a smaller number of large-capacity battery modules 100 are mounted in the pack housing 300, the number of parts such as inter-bus bars, harness cables and connectors may be reduced.

In addition, in the battery pack 10 of the present disclosure in which large-capacity battery modules 100 are mounted, the space occupancy purely occupied by battery cells may be further increased than the space occupancy occupied by the module cases 110 and its accessories inside the pack housing 300, compared to a conventional battery pack in which general battery modules 100 are mounted, and thus there is an advantage in that the energy density per unit volume may be significantly improved.

For reference, the high-capacity battery module 100 of this embodiment may include approximately 48 long cells per unit. For reference, the existing battery module 100 to which pouch-type secondary batteries are applied has a width (in a stacking direction of the pouch cells) of about 150 mm to 250 mm, but the large-capacity battery module 100 according to this embodiment has a width of about 800 mm.

The electric component assembly 200 may include a relay device, a current sensor, a fuse, a BMS, a MSD (Manual Service Disconnector), and the like. The relay device is a switching component that selectively opens and closes a charging/discharging path through which a current flows, and may block the flow of a charging/discharging current when an abnormal situation occurs in the battery pack 10. The BMS refers to a battery management system that overall controls the charging/discharging operation of the battery modules 100, and may be regarded as a component commonly included in the battery pack 10. In addition, the MSD (Manual Service Disconnector) is a system to selectively cut off the power of a high-voltage battery by a physical method, and when necessary, the MSD disconnects a service plug to cut off the power.

The electric component assembly 200 as above may be packaged so as not to be exposed to the outside by the pack housing 300 and the pack cover 600 together with the battery modules 100.

The pack housing 300 provides a space to accommodate the battery modules 100 and the electric component assembly 200 therein, and may be regarded as a structure including a bracket 332 or mounting structures 343, 353 to be coupled to a vehicle body.

The pack housing 300 provides a mechanical support to the battery modules 100 and the electric component assembly 200 and protects them from external shocks, so the pack housing 300 is preferably made of a metal material with high rigidity.

Figure 4:
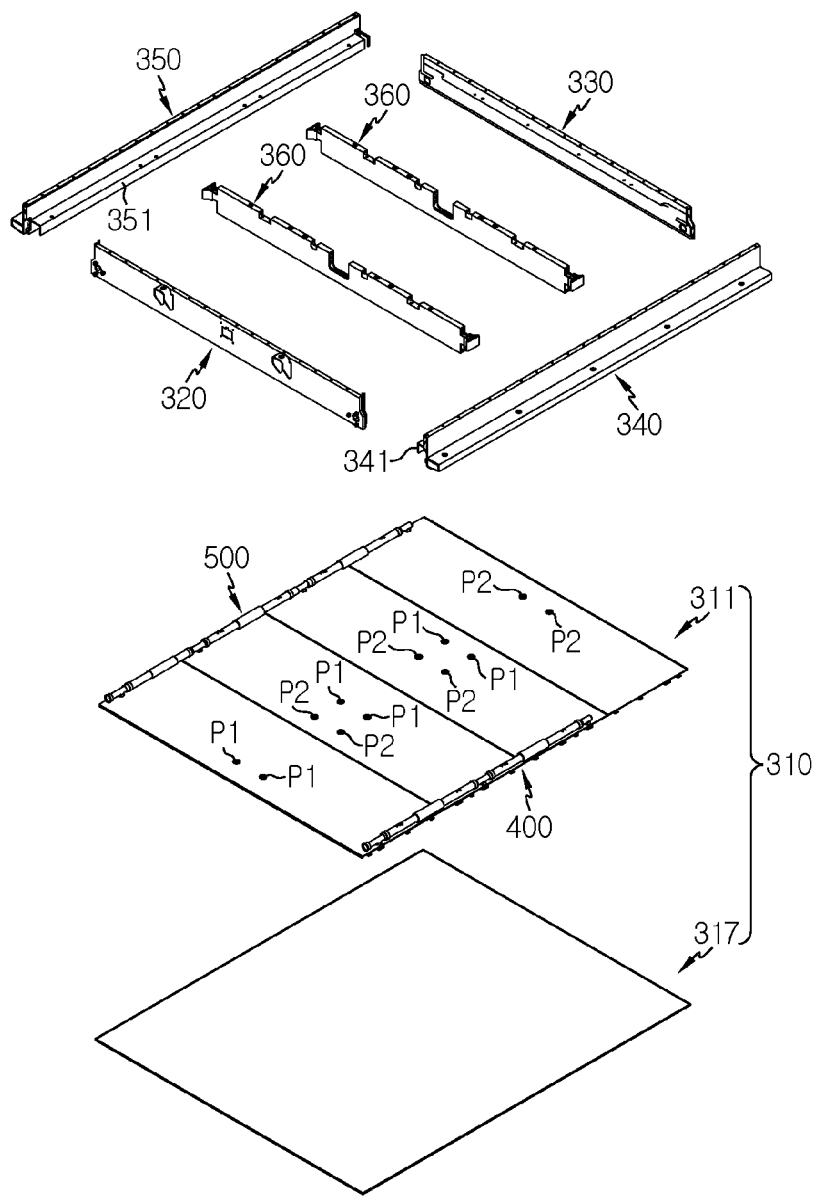
FIG. 4 is an exploded perspective view showing the pack housing of FIG. 3.
Figure 5:
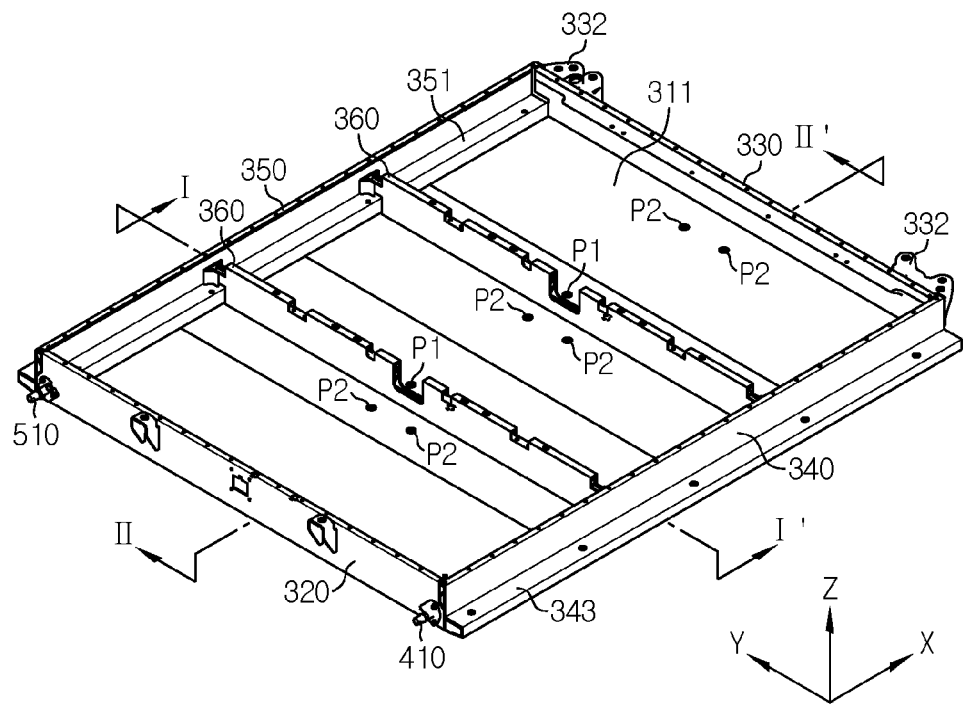
FIG. 5 is an assembled perspective view showing the pack housing of FIG. 4.

Specifically, as shown in FIGS. 4 and 5, the pack housing 300 according to this embodiment may include a lower frame 310 provided in a wide plate shape on which the battery modules 100 may be placed, as well as a front frame 320, a rear frame 330, a right side frame 340 and a left side frame 350 vertically coupled along an edge of the lower frame 310 to form walls, and cross beams 360 coupled to both ends of the right side frame 340 and the left side frame 350.

The lower frame 310, the front frame 320, the rear frame 330, the right side frame 340, the left side frame 350 and the cross beam 360 are an aluminum extrusion structure, respectively, and the pack housing 300 may be made by welding and bolting the frames.

For example, the frames are manufactured by extruding aluminum with empty spaces and ribs mixed therein, and the frames are welded to form the pack housing 300, thereby reducing the weight of the pack housing 300 and maintaining the mechanical rigidity at a reliable level or higher.

Meanwhile, the coolant channels 313A, 313B are integrated in the lower frame 310 that constitutes the pack housing 300 of the present disclosure. Hereinafter, the configuration of the lower frame 310 will be described in detail.

The lower frame 310 according to the present disclosure may be provided in a double-layer structure including a floor panel 311 and a base plate 317. For example, the base plate 317 is formed below the floor panel 311 in a layered form, and the floor panel 311 and the base plate 317 may be provided to have the same area.

Figure 6:
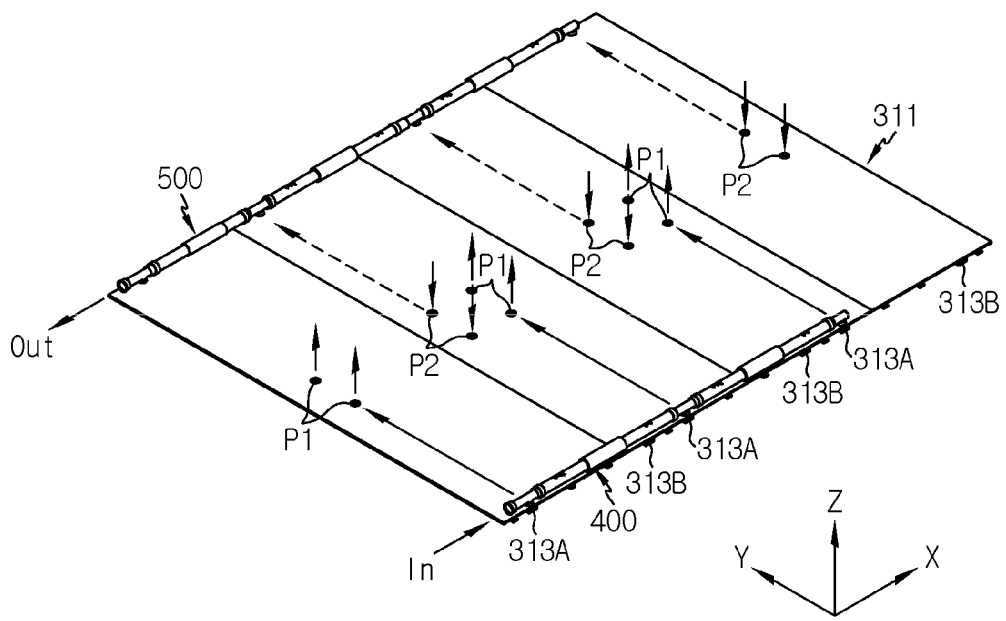
FIG. 6 is a diagram showing an upper surface of a floor panel of FIG. 4.
Figure 7:
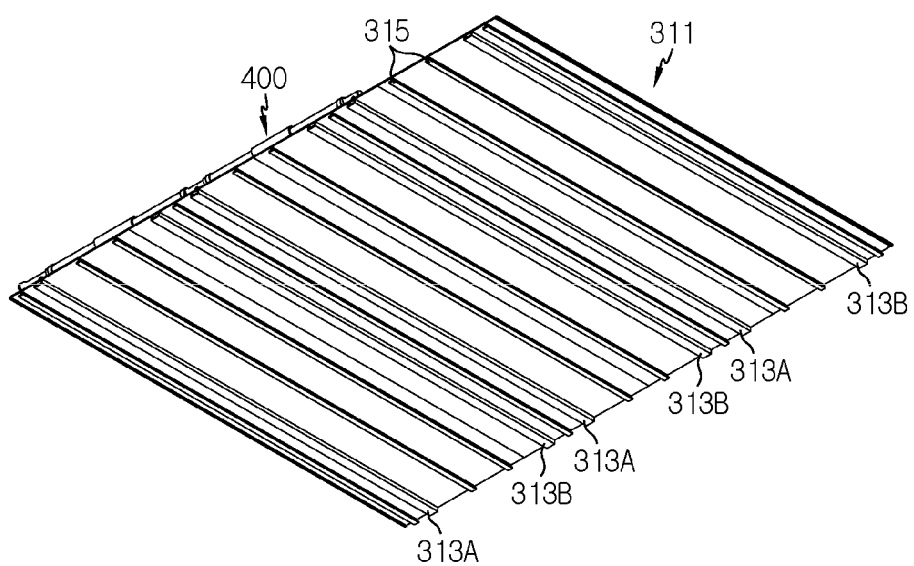
FIG. 7 is a diagram showing a lower surface of the floor panel of FIG. 6.

As shown in FIGS. 6 and 7, the floor panel 311 includes an upper surface on which the battery modules 100 may be placed, coolant channels 313A, 313B for supplying or discharging a coolant to/from the heatsink 130 of the battery modules 100, and a lower surface on which a support member 315 is formed to maintain an interlayer interval with the base plate 317.

The upper surface of the floor panel 311 is formed with a flat and wide surface so that the plurality of battery modules 100 may be arranged in a matrix on the same plane, and the lower surface of the floor panel 311 may be configured such that the coolant channels 313A, 313B and the support members 315 protrude in a tube or bar shape to form a convex pattern.

The coolant channels 313A, 313B may be provided in a rectangular tube shape extending from a right side line to a left side line (in the Y-axis direction) of the floor panel. The coolant channels 313A, 313B may serve as passages for guiding the flow of coolant from the left side to the right side of the floor panel or from the right side to the left side of the floor panel.

Figure 8:
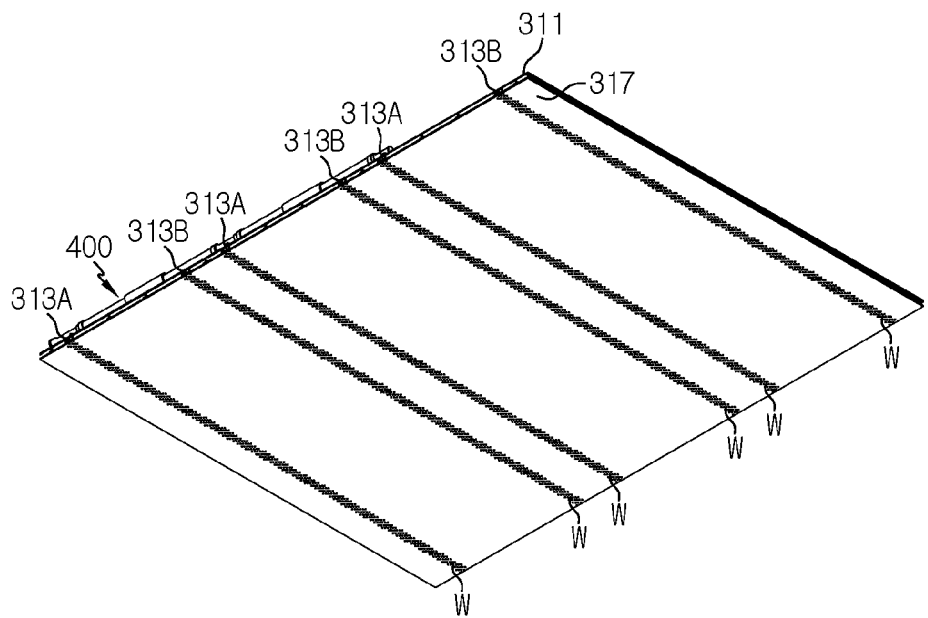
FIG. 8 is a diagram showing a state where a base plate is welded to the floor panel of FIG. 7.
Figure 9:
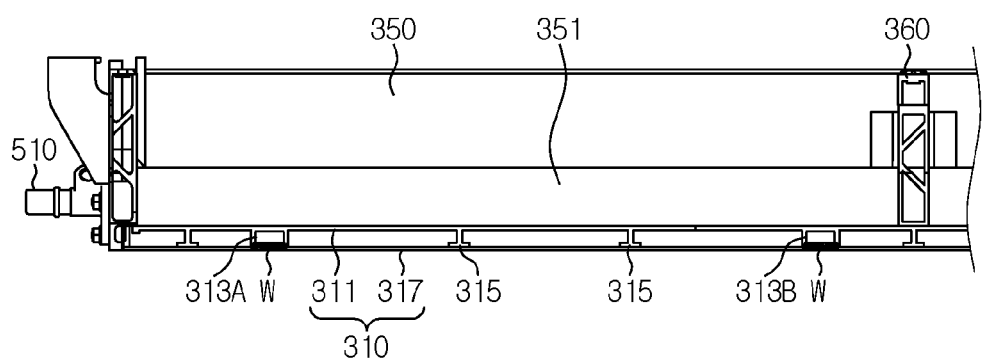
FIG. 9 is a partial sectional view showing the pack housing according to an embodiment of the present disclosure.

In addition, the coolant channels 313A, 313B may be configured such that their lower ends are fixedly coupled to the base plate 317. Referring to FIGS. 8 to 9, in this embodiment, the bottom surfaces of the coolant channels 313A, 313B in a rectangular tube shape and the base plate 317 are placed to be overlapped and then joined to each other by friction stir welding W.

For example, even if there is a slight gap between the coolant channels 313A, 313B and the base plate 317, there is a risk that the coolant channels 313A, 313B may be continuously hit and damaged when the base plate 317 vibrates. Accordingly, in the present disclosure, in order to prevent this situation, the coolant channels 313A, 313B and the base plate 317 are joined so that the coolant channels 313A, 313B are not hit when the base plate 317 vibrates.

For reference, the floor panel 311 including the coolant channels 313A, 313B may be easily divided into 4 parts for easy aluminum extrusion, and the base plate 317 corresponding to a bottom end of the pack housing 300 may be made of a steel plate to maximize rigidity.

In general, different kinds of metals such as aluminum and steel are difficult to attach to each other and are often joined using a rivet. However, the joined surface without a rivet may float, resulting in incomplete contact. In order to solve the problem of the rivet method, in this embodiment, friction stir welding is used such that the coolant channels 313A, 313B are completely joined to the base plate 317 along an extension direction thereof.

In other words, after the lower surfaces of the coolant channels 313A, 313B are overlapped with the base plate 317, the base plate 317 may be pressed, rotated and pressurized by pushing a tool such that the coolant channels 313A, 313B and the base plate 317 are joined. That is, by the pressure exceeding a certain limit, the base plate 317 and the lower surfaces of the coolant channels 313A, 313B are transformed like a liquid from a solid state so that the two metals are attached to each other.

The friction stir welding does not require a separate welding material and is very eco-friendly because harmful rays and harmful gases are not generated.

The support member 315 has a longitudinal section of a '⊥' shape to extend from the right side line to the left side line in parallel with the coolant channels 313A, 313B, and friction stir welding may also be applied to the base plate 317 like the coolant channels 313A, 313B. In this way, the floor panel 311 and the base plate 317 may be fixedly coupled firmly to form the lower frame 310.

Figure 10:
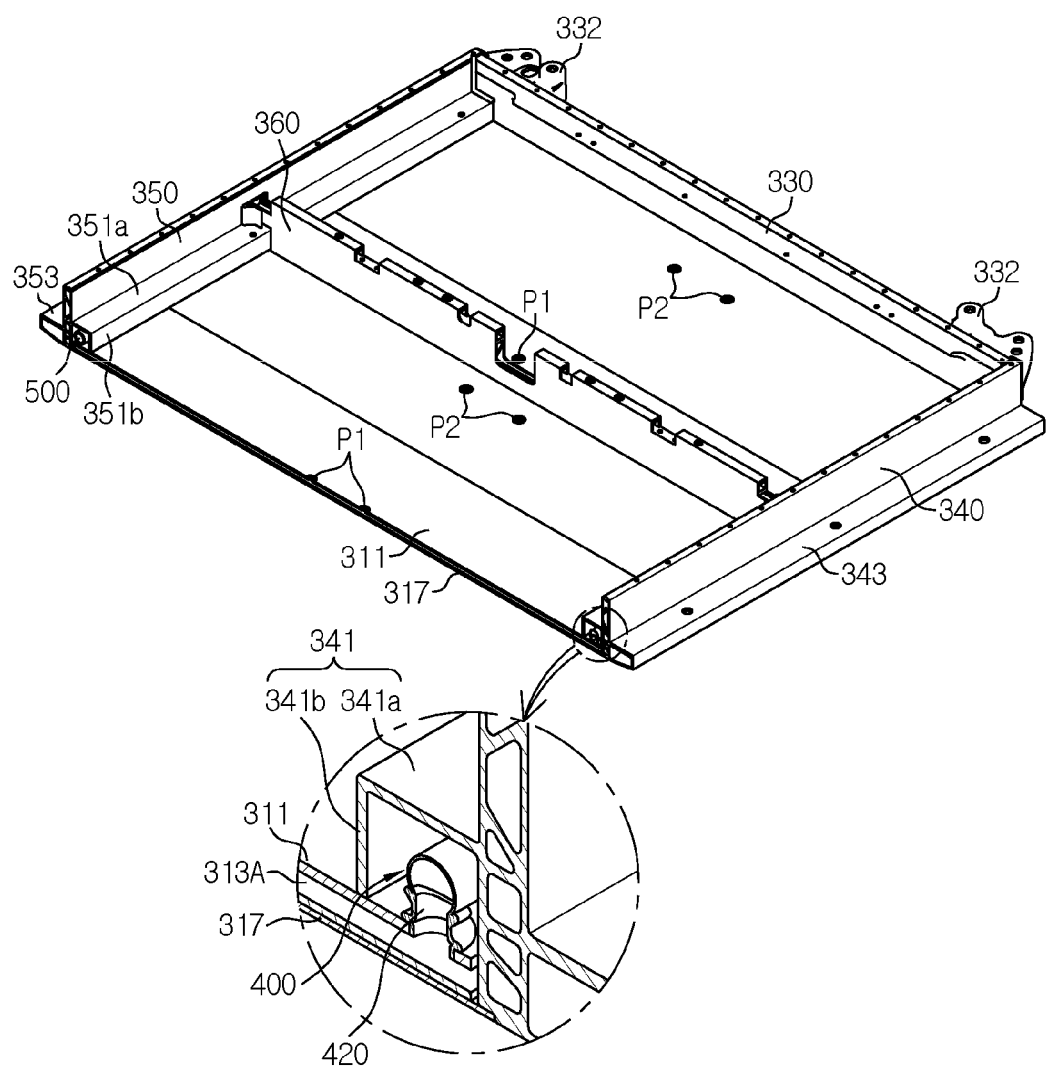
FIG. 10 is a sectioned perspective view showing the pack housing, taken along the line I-I' of FIG. 5.
Figure 11:
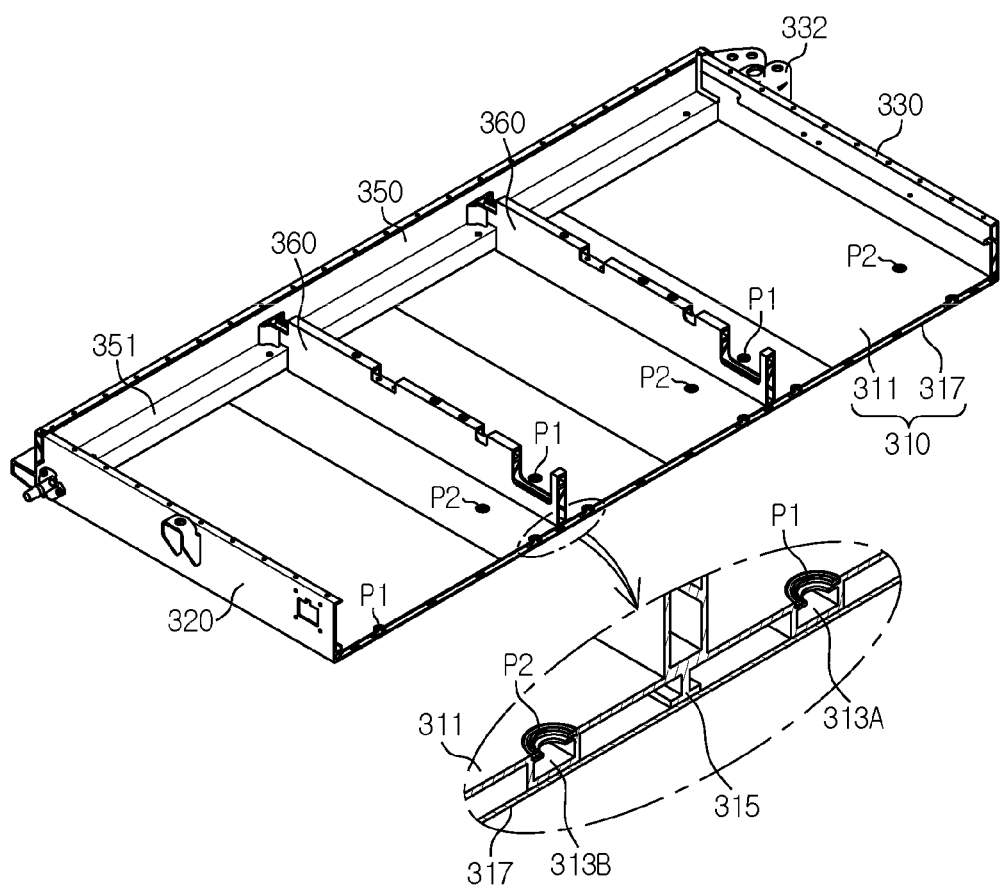
FIG. 11 is a sectioned perspective view showing the pack housing, taken along the line II-II' of FIG. 5.

Referring to FIGS. 10 to 12 along with FIGS. 6 and 7, the battery pack 10 according to the present disclosure further includes a coolant supply pipe 400 for supplying a coolant to the coolant channels 313A, 313B, and a coolant discharge pipe 500 for discharging a coolant from the coolant channels 313A, 313B.

The coolant supply pipe 400 may be coupled to the upper surface of the floor panel 311 and may be arranged along the right side line of the floor panel 311. In addition, an inlet port 410 of the coolant supply pipe 400 may be exposed out of the pack housing 300 through the front frame 320, and a coolant is injected into the inlet port 410 of the coolant supply pipe 400 from the outside to flow into the pack housing 300.

The coolant supply pipe 400 may be covered by the right side frame 340 while the right side frame 340 is being coupled to the floor panel 311. To this end, the right side frame 340 may include a first pipe protection membrane 341 provided to cover the coolant supply pipe 400. Referring to FIG. 10, the first pipe protection membrane 341 may include a first horizontal plate 341a disposed on the coolant supply pipe 400 and a first vertical plate 341b bent at one end of the first horizontal plate 341a to extend downward so that an end line thereof is coupled to the floor panel 311.

The first pipe protection membrane 341 may be configured such that the first horizontal plate 341a and the first vertical plate 341b are elongated along the right side line of the floor panel 311 to cover the entire coolant supply pipe 400. In addition, the end line of the first vertical plate 341b is welded to the floor panel 311, so that, even when a coolant leaks from the coolant supply pipe 400, the coolant does not flow out to the upper surface of the floor panel 311, thereby preventing a short circuit accident.

Also, the first horizontal plate 341a may be used as a place for fixing the battery module 100. For example, as shown in FIG. 12, the battery module 100 may include a fastening block 120 configured to protrude from the module casing and provided so that a bolt B is inserted therein in a vertical direction. The fastening block 120 may be provided at a height capable of being placed on the upper surface of the first horizontal plate 341a inside the battery module 100. The battery modules 100 may be fixed to the right side frame 340 by fastening the bolt B to the fastening block 120 placed on the first horizontal plate 341a.

The coolant discharge pipe 500 may be coupled to the upper surface of the floor panel 311 and may be provided to be disposed along the left side line of the floor panel 311.

An outlet port 510 of the coolant discharge pipe 500 may be provided to be exposed out of the pack housing 300 through the front frame 320. The coolant inside the pack housing 300 may exit to the outside toward the front frame 320 through the outlet port 510 of the coolant discharge pipe 500.

Similar to the coolant supply pipe 400 described above, the coolant discharge pipe 500 may be covered by the left side frame 350 not to be exposed to the outside while the left side frame 350 is being coupled to the floor panel 311.

To this end, the left side frame 350 may include a second pipe protection membrane 351 provided to cover the coolant discharge pipe 500. The second pipe protection membrane 351 may include a second horizontal plate 351a disposed on the coolant discharge pipe 500 and a second vertical plate 351b bent at one end of the second horizontal plate 351a to extend downward so that an end line thereof is welded to the floor panel 311.

That is, the second pipe protection membrane 351 may be provided symmetrically with the first pipe protection membrane 341 described above, and plays a role of protecting the coolant discharge pipe 500 from external impact and preventing a short circuit accident by blocking a coolant not to flow out the upper surface of the floor panel 311 even if the coolant leaks.

In addition, the second horizontal plate 351a may be bolted to the fastening block 120 of the battery module 100, similar to the first horizontal plate 341a described above, to fix the battery module 100.

Hereinafter, the cooling path structure of the battery pack 10 according to the present disclosure will be described in more detail with reference to FIGS. 6 and 7 and FIGS. 10 to 12 again.

The coolant channels 313A, 313B may be disposed to be spaced apart from each other in the following pattern along the front and rear direction (X-axis direction) of the pack housing 300.

Referring to FIGS. 6 and 7, the coolant channels 313A, 313B may be classified into a first coolant channel 313A, which is the coolant channel 313A, 313B for introducing a coolant into any one battery module 100, and a second coolant channel 313B, which is the coolant channel 313A, 313B for discharging a coolant from the any one battery module 100. The first coolant channel 313A and the second coolant channel 313B may be provided in a plurality of pairs. The interval between the pair of the first coolant channel 313A and the second coolant channel 313B may be determined to be smaller than the width of the battery module 100. In this embodiment, three pairs of coolant channels 313A, 313B are provided at the lower surface of floor panel 311 in the above-described pattern.

The coolant supply pipe 400 and the coolant discharge pipe 500 are connected to selectively communicate with the coolant channels 313A, 313B.

More specifically, the coolant supply pipe 400 is connected to communicate with the first coolant channels 313A, and the coolant discharge pipe 500 is connected to communicate with the second coolant channels 313B.

At this time, the coolant supply pipe 400 and the first coolant channel 313A may be connected by a pipe connector 420, respectively. For example, as shown in FIG. 10, a hole may be provided in a vertical direction at a right edge of the first coolant channel 313A, and a pipe connector 420 may be interposed between the hole and the coolant supply pipe 400. The coolant discharge pipe 500 may be connected to communicate only with the second coolant channels 313B in the same way as the coolant supply pipe 400.

According to this configuration, the coolant flowing in the coolant supply pipe 400 may move only to the first coolant channels 313A, and the coolant flowing in the second coolant channel 313B may move only to the coolant discharge pipe 500.

Referring to FIGS. 6 and 11, in a central area of the floor panel 311, two injection ports P1 may be provided for one first coolant channel 313A, and two discharge ports P2 may be provided for one second coolant channel 313B.

The injection port P1 has a hole shape communicating vertically with the inner space of the first coolant channel 313A, and a sealing material may be provided around the hole. One of the two injection ports P1 may be positioned at a right side with respect to a (virtual) center line in the front and rear direction of the floor panel 311 and the other one may be positioned on a left side.

The discharge port P2 may be provided in the same structure as the injection port P1 to communicate with the inner space of the second coolant channel 313B in a vertical direction. Therefore, the injection port P1 and the discharge port P2 are alternately provided along the front and rear direction (X-axis direction) of the floor panel 311.

That is, in this embodiment, six injection ports P1 and six discharge ports P2 are provided at the upper surface of the floor panel 311, and two injection ports P1 and two discharge ports P2 are alternately provided in the front and rear direction (X-axis direction), repeatedly.

In addition, six battery modules 100 according to this embodiment (see FIG. 3) are provided in total, and they are arranged in two rows and three columns such that every two battery modules 100 face each other based on the center line of the floor panel 311.

The bottom surface of each battery module 100 includes a heatsink 130, the heatsink 130 may have an entrance and an exit spaced apart from each other in the width direction of the battery module 100 so as to be vertically inserted into the injection port P1 and the discharge port P2 of the floor panel 311.

Each of two battery modules 100A, 100B arranged to face each other may receive a coolant through one of two injection ports P1 communicating with the same first coolant channel 313A and discharge a coolant through one of two discharge ports P2 communicating with the same second coolant channel 313B.

In other words, as shown in FIG. 12, the coolant flowing through the coolant supply pipe 400 may be branched into three first coolant channels 313A and introduced into the heatsink 130 of the battery module 100 through the injection port P1. In addition, the coolant absorbing heat from the heatsink may be discharged to the second coolant channel 313B through the discharge port P2.

That is, the six battery modules 100 are placed on the floor panel 311 such that the entrance and exit of each heatsink 130 are connected to the injection port P1 and the discharge port P2 of the floor panel 311. Accordingly, for all of the six battery modules, the battery cells accommodated therein may be cooled by a coolant flowing in the order of the coolant supply pipe 400→the first coolant channel 313A→each battery module 100→the second coolant channel 313B→the coolant discharge pipe 500.

As described above, in the battery pack 10 of the present disclosure, the coolant channels 313A, 313B, the injection port P1 and the discharge port P2 capable of supplying a coolant to the battery modules 100 or discharging a coolant from the battery modules 100 are integrated at the floor panel 311, and the heatsink 130 is integrated with the battery module 100. The battery pack 10 of the present disclosure configured as above has no other cooling parts that should be fixed or installed in the pack housing 300, except for the coolant supply pipe 400 and the coolant discharge pipe 500, so the assembly process of the battery pack 10 may be significantly simplified compared to the prior art.

In addition, the coolant supply pipe 400 and the coolant discharge pipe 500 are covered and protected by the right side frame 340 and the left side frame 350, respectively, and the coolant channels 313A, 313B are joined to the base plate 317 by friction stir welding, so the cooling path may be maintained stably against shock or vibration.

Meanwhile, the battery pack 10 according to the present disclosure may be included as a power energy source of a vehicle such as an electric vehicle or a hybrid electric vehicle. That is, the vehicle according to the present disclosure may include the battery pack 10 described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A battery pack, comprising:
battery modules provided with a heatsink;
a pack housing including a floor panel having an upper surface on which the battery modules are placed and a lower surface in which coolant channels for supplying and discharging a coolant to/from the heatsink of the battery modules are provided, and a base plate disposed below the floor panel in a layered form; and
a coolant supply pipe configured to selectively communicate with the coolant channels and be coupled to an upper surface of the floor panel and disposed along a right side line of the floor panel; and
a coolant discharge pipe configured to selectively communicate with the coolant channels and be coupled to the upper surface of the floor panel and disposed along a left side line of the floor panel,
wherein the coolant channels have a lower end fixedly coupled to the base plate.

2. The battery pack according to claim 1,
wherein the coolant channels are provided in a rectangular tube shape to extend from the right side line to the left side line of the floor panel, and the lower end of the coolant channels is joined to the base plate by friction stir welding.

3. The battery pack according to claim 1,
wherein the floor panel further includes a support member formed on the lower surface of the floor panel to protrude as much as a thickness of the coolant channels.

4. The battery pack according to claim 3,
wherein the support member has a longitudinal section of a '⊥' shape extending from the right side line to the left side line of the floor panel.

5. The battery pack according to claim 1,
wherein the heatsink is configured as a bottom plate of the battery module.

6. The battery pack according to claim 1,
wherein the coolant channels include a first coolant channel configured to introduce a coolant into any one battery module and a second coolant channel configured to discharge a coolant from the any one battery module, and
wherein the first coolant channel and the second coolant channel are provided in a plurality of pairs, and the plurality of pairs of first coolant channels and second coolant channels are arranged at predetermined pattern intervals along a front and rear direction of the pack housing.

7. The battery pack according to claim 6,
wherein the interval between the pairs of first coolant channels and the second coolant channels is smaller than a width of the battery modules.

8. The battery pack according to claim 6,
wherein two injection ports are provided in a central area of the floor panel for one first coolant channel and two discharge ports are provided in the central area of the floor panel for one second coolant channel.

9. The battery pack according to claim 8,
wherein the battery modules are arranged such that two battery modules face each other, respectively, and
wherein the two battery modules facing each other are configured such that the coolant is supplied thereto through one of the two injection ports, respectively, and the coolant is discharged therefrom through one of the two discharge ports, respectively.

10. The battery pack according to claim 1,
wherein the pack housing further includes a front frame forming a front wall, a rear frame forming a rear wall, a right side frame forming a right wall and a left side frame forming a left wall, and
wherein the front frame, the rear frame, the right side frame and the left side frame are vertically coupled to the floor panel, respectively.

11. The battery pack according to claim 10,
wherein the right side frame includes a first pipe protection membrane configured to cover the coolant supply pipe, and
wherein the left side frame includes a second pipe protection membrane configured to cover the coolant discharge pipe.

12. The battery pack according to claim 11,
wherein the first pipe protection membrane includes a first horizontal plate disposed on the coolant supply pipe and a first vertical plate bent at one end of the first horizontal plate to extend downward with an end line of the first vertical plate being welded to the floor panel, and
wherein the second pipe protection membrane includes a second horizontal plate disposed on the coolant discharge pipe and a second vertical plate formed at one end of the second horizontal plate to extend downward with an end line of the second vertical plate being welded to the floor panel.

13. The battery pack according to claim 12,
wherein at least one side of the battery modules is fastened to the first horizontal plate or the second horizontal plate by a bolt.

14. The battery pack according to claim 10,
wherein the floor panel, the front frame, the rear frame, the right side frame and the left side frame are an aluminum extrusion structure, respectively.

15. A vehicle, comprising the battery pack according to claim 1.

* * * * *